United States Patent [19]

Bennett et al.

[11] E Patent Number: Re. 32,643

[45] Reissued Date of Patent: Apr. 12, 1988

[54] MAGNETICALLY ATTACHABLE ELECTRIC PREHEATER FOR AUTOMOBILE ENGINES

[75] Inventors: James W. Bennett, Wrenshall; Gary L. Howe, Minneapolis; Kenneth A. Jaakola, Cloquet; Samuel G. Koutavas, Minneapolis, all of Minn.

[73] Assignee: Winland Electronics, Inc., Mankato, Minn.

[21] Appl. No.: 753,453

[22] Filed: Jul. 9, 1985

Related U.S. Patent Documents

Reissue of:

[64] Patent No.: 4,506,138
Issued: Mar. 19, 1985
Appl. No.: 491,870
Filed: May 5, 1983

[51] Int. Cl.[4] ..... F01M 5/02; F02N 17/04; H05B 3/20

[52] U.S. Cl. ..... 219/205; 123/142.5 E; 219/208; 219/311; 219/526; 219/535; 219/536; 219/538; 248/206.5

[58] Field of Search ..... 219/205-208, 219/202, 535, 536, 526, 254, 255, 311, 538, 542; 126/24, 42; 38/74, 82; 123/142.5 E, 142.5 R; 248/206.5

[56] References Cited

U.S. PATENT DOCUMENTS

| | | | |
|---|---|---|---|
| 619,314 | 2/1899 | Jones | 219/531 |
| 888,381 | 5/1908 | Andrews et al. | 219/517 X |
| 1,174,548 | 3/1916 | Cook | 219/526 |
| 1,285,013 | 11/1918 | Browder | 219/208 |
| 1,360,452 | 11/1920 | Sharpe | 219/526 X |
| 1,781,412 | 11/1930 | Schlicter | 219/205 X |
| 1,869,629 | 8/1932 | Stranszky | 219/535 |
| 1,999,003 | 4/1935 | Bushnell | 219/205 |
| 2,026,797 | 1/1936 | Pierson | 219/536 |
| 2,122,694 | 7/1938 | Muller | 38/74 X |
| 2,475,989 | 7/1949 | Ronning | 219/205 X |
| 2,500,399 | 3/1950 | Broome | 219/535 |
| 2,507,213 | 5/1950 | McConnell | 219/205 |
| 2,659,169 | 11/1953 | Brennan . | |
| 2,678,991 | 5/1954 | Amfitheatrof | 126/24 UX |
| 2,698,374 | 12/1954 | Carpenter | 219/205 |
| 2,702,335 | 2/1955 | Cordis | 219/205 X |
| 2,725,457 | 11/1955 | Norton | 219/535 X |
| 2,804,535 | 8/1957 | Tuttle . | |
| 2,873,343 | 2/1959 | Collopy | 219/208 X |
| 2,932,538 | 4/1960 | Holmes . | |
| 2,954,257 | 9/1960 | Besuch et al. | 248/206.5 |
| 3,119,003 | 1/1964 | Duke | 126/42 X |
| 3,156,813 | 11/1964 | Trainor | 219/345 X |
| 3,194,944 | 7/1965 | Papp | 219/205 |
| 3,198,468 | 8/1965 | Vye | 219/536 X |
| 3,394,243 | 7/1968 | Lee | 219/205 |
| 3,408,771 | 11/1968 | Garrett et al. | 248/206.5 |
| 3,423,574 | 1/1969 | Shomphe et al. | 219/517 X |
| 3,564,199 | 2/1971 | Blaha | 219/205 X |
| 3,835,290 | 9/1974 | Peters | 219/205 |
| 4,278,876 | 7/1981 | Savoca et al. | 219/536 X |
| 4,313,048 | 1/1982 | Holbrook | 219/205 X |

FOREIGN PATENT DOCUMENTS

| | | | |
|---|---|---|---|
| 159943 | 11/1959 | Australia | 38/74 |
| 2758157 | 6/1979 | Fed. Rep. of Germany | 219/205 |
| 167291 | 5/1959 | Sweden | 219/205 |
| 569805 | 6/1945 | United Kingdom | 219/205 |
| 1131821 | 10/1968 | United Kingdom | 219/254 |

OTHER PUBLICATIONS

Abandoned Patent Application 06/375,365, filed 05/06/82 by inventors Bennett, Howe, Jaakola and Koutavas.

*Primary Examiner*—Anthony Bartis
*Attorney, Agent, or Firm*—Kinney & Lange

[57] ABSTRACT

A preheater unit magnetically attachable to the surface of the oil pan of an automobile engine includes an electric heating unit and a magnetic device situated within a rectilinear shell having an open side closed by a non-magnetic heat transfer plate. The heating unit is encased in the plate and surrounds the magnetic device. The magnetic device includes a permanent magnet disposed between two magnetic end portions situated to be operative in the same plane as the outer planar surface of the plate through parallel spaced apart openings in the plate for magnetically attaching the preheater unit to the surface of the oil pan. A temperature control switch within the shell maintains the heat transfer plate within predetermined temperature limits. To avoid problems caused by differences in the coefficients of expansion of the magnet and heat transfer plate, a magnet positioning member of non-magnetic material cooperates with the shell to hold the magnet in place while allowing room for the magnet to expand and contract.

25 Claims, 1 Drawing Sheet

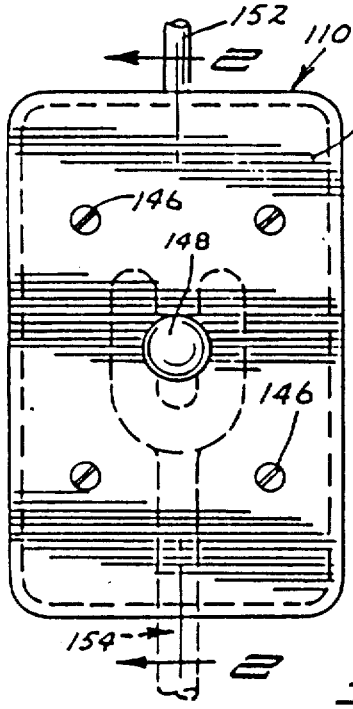
FIG. 1
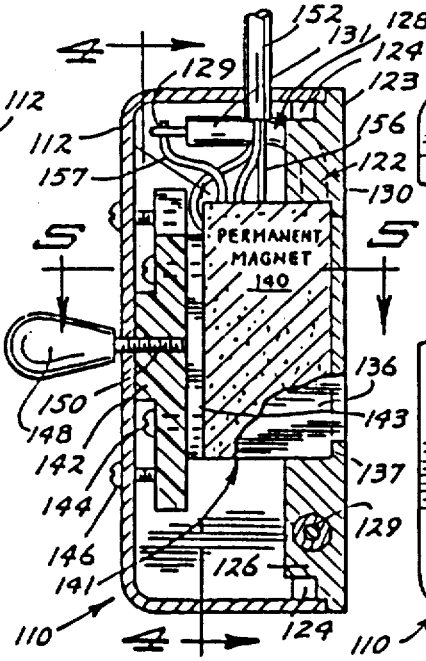
FIG. 2
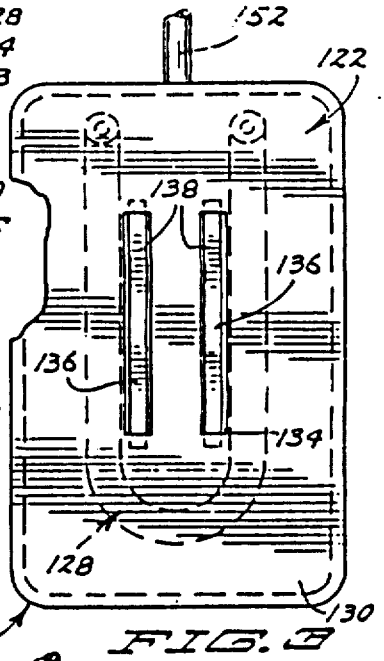
FIG. 3
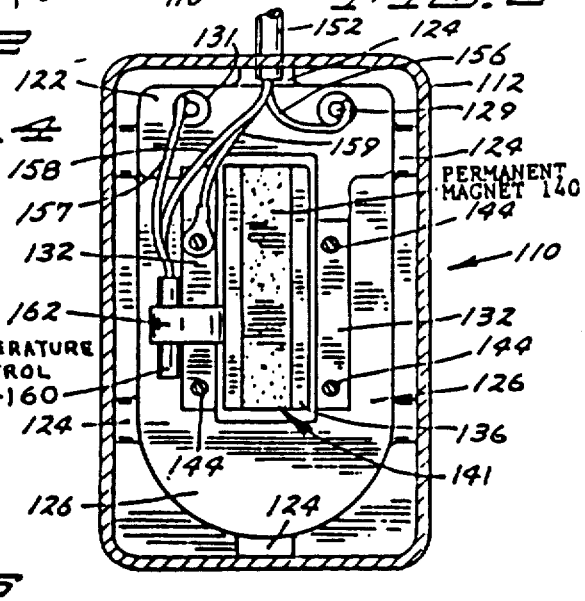
FIG. 4
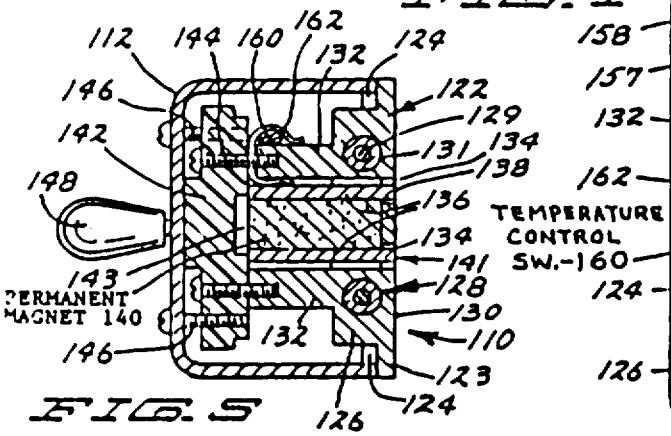
FIG. 5
FIG. 6
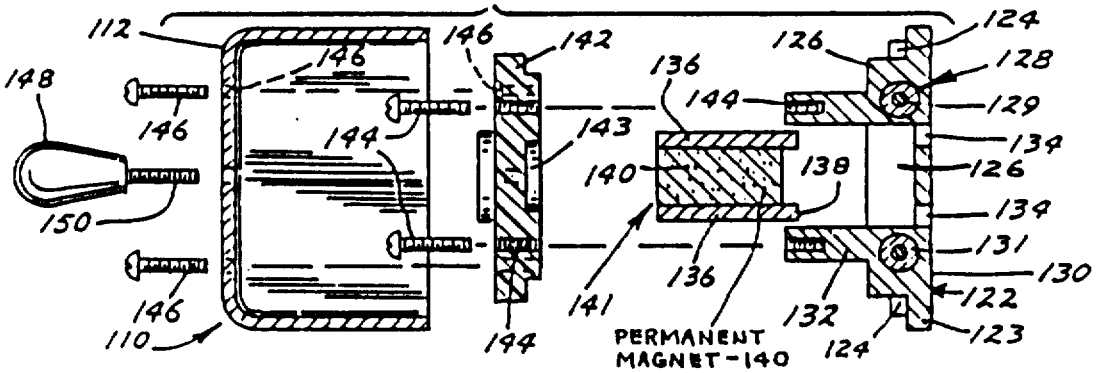

MAGNETICALLY ATTACHABLE ELECTRIC PREHEATER FOR AUTOMOBILE ENGINES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention has relation to an electric heater which can be externally attached to a wall of the oil pan of an automobile engine or other magnetically attractable material by the use of magnetics, can be plugged into a standard household electrical outlet, for example, and can be readily or automatically removed from the engine at the time the automobile is withdrawn from its garage or other storage place.

2. Description of the Prior Art

It is well known to magnetically attach electrically energized heaters to automotive engines. See the following patents:

| U.S. Pat. Nos. | | |
|---|---|---|
| 3,194,944 | Papp | 7/13/65 |
| 3,835,290 | Peters | 9/10/74 |

It is known to fix magnetically supported automobile engine heaters to the underside of automobiles using handles. See:

| | | |
|---|---|---|
| 2,702,335 | Cordis | 3/15/55 |
| 3,394,243 | Lee | 7/23/68 |

During the preparation of this patent application, there was an Office Action on a copending application, Ser. No. 06/375,365, filed by us on May 6, 1982. Application Ser. No. 06/375,365 is now abandoned. In that Office Action, certain specific prior art was cited. Before the earlier application was filed, a search was made on the form of the invention disclosed in that application. All of this prior art has now been taken into consideration.

A major problem with magnetically attached heaters of the prior art has been the differences in the physical properties of a heat transfer plate having high heat conductivity and an effective magnet to work to hold the heater to the object to be heated. Permanent bar magnets, such as ceramic magnets, for example, expand and contract at different rates from heat transfer plates such, for example, as aluminum. This difference is accentuated by the fact that the aluminum takes on heat and gives up heat much faster than does the ceramic magnet. Where the two have been bonded together, this difference in coefficient of expansion and in rate of heat transfer has invariably caused the more brittle magnet to break when the magnet was closely associated with an electrical heating element used to heat the heat transfer plate. To overcome this difficulty, many of the magnetically attachable heaters of the prior art resorted to using individual magnets spaced outwardly from opposite ends of the electrical heater and heat transfer plate assemblies. Several such structures are shown in the prior art cited herein.

Such structures, while fairly effective to heat large flate plate areas, are notably ineffective where the heat must be applied in a relatively small confined area such as is often encountered in using such heaters to thaw frozen radiators, water pipes, drain pipes and, for that matter, to apply heat to oil pans of today's diminutive automobile engines.

What was needed before the present invention was a magnetically attachable heater wherein substantially the entire face of a heat transfer plate can be heated to the desired temperature, and wherein the magnetic means can operate effectively from a center portion of such heat transfer plate.

Applicants, and those in privity with them, are aware of no prior art closer than that discussed or referred to above, and are aware of no prior art which anticipates the claims herein.

SUMMARY OF THE INVENTION

An electrical heater designed to be magnetically attracted to the wall of an object to be heated is here disclosed as a magnetically attachable preheater for automobile engines. In the form of the invention as shown, the preheater is encased with a case of material which may or may not be magnetic.

A transfer plate having high heat conductivity forms the major surface of the working face of the heater. The heating unit is, in turn, encased in the heat transfer plate to be in heat transmitting relationship to it. The magnetic means projects through provided magnetic means receiving openings as a central portion of the heat transfer plate to form with the exterior of the heat transfer plate a smooth, flush surface suitable to be magnetically adhered to a portion of a magnetically attractable face of an object to be heated such, for example, as the bottom or side of an oil pan of an automobile engine.

The electrical heating unit is in encompassing and surrounding relation to the magnetic means and is connected to an electrical cable which extends through the heater case to position where it can be plugged into a conventional residential electrical outlet, for example. In series with the electrical cable and the electrical heating unit inside of the case is a heat activated temperature control switch which will close at a lower temperature and will open at a higher temperature to control the power output from the heating unit through the heat transfer plate.

In order to avoid the problems caused by differences in coefficients of expansion of ceramic magnets and aluminum heat transfer plates, for example, the magnet is not in any way bonded to the heat transfer plate or to any other element of the heater. Instead, portions of the heat transfer plate and of a magnetic means positioning member of non-magnetic material are fashioned to provide a magnetic means positioning chamber of size and configuration to hold the ceramic magnet, for example, in place but to allow it room to expand and contract in all directions.

In the form of the invention as shown, the heat transfer plate includes an integral heating unit encasement member inside of the outer case, lying in a plane substantially parallel to the working face of the heat transfer plate and extending in direction away from that working face. The electrical heating unit is substantially entirely encased within this encasement member. In this form of the invention, the electrical heating unit is generally U-shape in configuration, and the magnetic means receiving openings in the heat transfer plate are situated in parallel relationship to each other within the legs of the U-shape heating element.

Also, as shown, the magnetic means is U-shape and has outer end portions of size and configuration to extend through the openings in the heat transfer plate.

BRIEF DESCRIPTION OF THE DRAWINGS

FIG. 1 is a plan view of a preheater made according to the invention and showing a side opposite the working face thereof;

FIG. 2 is a sectional view taken on the line 2—2 in FIG. 1;

FIG. 3 is a top plan view of the preheater of FIGS. 1 and 2 showing the working face thereof;

FIG. 4 is a sectional view taken on the line 4—4 in FIG. 2;

FIG. 5 is a sectional view taken on the line 5—5 in FIG. 2; and

FIG. 6 is an exploded view also taken on the line 5—5 in FIG. 2 with parts omitted for clarity of illustration.

DETAILED DESCRIPTION OF THE PREFERRED EMBODIMENT

A heater 110 includes an outer case 112 of non-magnetic material. A heat sink or heat transfer plate 122 is partially defined by a plane working face 130, and is provided with an outwardly extending peripheral flange 123 of dimension to receive the outer peripheral open edge of the case 112. A series of bosses 124 are integral with the heat transfer plate and extend away from the heat transfer plate working face at locations to snugly and fixedly position the outer case 112 when in contact with and in alignment with flange 123.

Forming an overall part of the heat transfer plate 122 in an integral, generally U-shape heating unit encasement member 126 extending in direction away from face 130. A Calrod-type electrical heating unit 128 itself includes a high resistance wire 129 encased in a conduit 131. A pair of mutually parallel, spaced-apart risers 132,132 also form part of the heating element encasement member 126 and extend integrally from parallel legs of the encasement member in direction away from face 130.

Heat transfer plate 122 is formed by casing it integrally around the heating unit 128 after outer end portions of the wire conduit 131 of the heating element are bent upwardly. After the heat transfer plate has been cast, these end portions of conduit 131 are supported in normal relationship to the heat transfer plate plane working face 130 to position outer ends of the high resistance wire 129 in parallel spaced-apart relationship with respect to each other and in spaced relation to the outer case 112.

A pair of rectangular, mutually parallel, spaced-apart magnetic concentrator plate-receiving openings 134,134 are provided through the heat transfer plate in parallel inwardly spaced relation from the risers 132,132. These concentrator plate receiving openings 134 are each positioned and shaped to receive an outer end portion of one of a pair of magnetic force concentrator plates 136,136. Notches 137 are provided in the concentrator plates 136 to positively position these outer end portions to have outer edge surfaces 138 thereof located in flush relationship with respect to the working face 130 of the heat transfer plate 122.

A rectilinear permanent bar magnet 140 fits snugly between, and in contact with the magnetic concentrator plates 136,136, and rests against a surface of the heat transfer plate 122 between the concentrator plate-receiving openings 134,134. The bar magnet 140 and concentrator plates 136,136 form a magnetic means indicated generally at 141.

A magnetic means positioning member of non-magnetic material constituted as a header block 142 fits against the concentrator plates 136,136. The header block is provided with a relief channel 143. This block 142 is fastened to upper end portions of risers 132,132 as at 144 to define with the heat transfer plate 122 a magnetic means positioning chamber to entrap magnetic means 141 and each element of its permanently in place without the need to bond these elements to each other or to any other portion of the heater 110.

As best seen in FIG. 5, the spaced-apart magnetic concentrator plate-receiving openings 134,134 are wider than the outer end portions of the magnetic force concentrator plates 136,136 which extend therethrough. These concentrator plates 136 will adhere by magnetic attraction to the bar magnet 140. This additional space provided in the concentrator plate receiving openings 134,134 and provided by the relief channel 143 in the header block 142 allow the magnetic means including the bar magnet 140 to expand and contract relative to the rest of the heater without putting any physical strain on the bar magnet 140. Thus even as the physical and magnetic properties of the magnet 140 change substantially when heated, the magnetic attraction of the magnetic means 141 will remain sufficiently effective for its intended purpose; and there is no danger of physical breakage of the magnetic means. Since the only attachment between the concentrator plates 136 and the bar magnet 140 is that of magnetic attraction, as the bar magnet expands and contracts relative to the concentrator plates, there can be face to face lateral slippage without any appreciable lessening of magnetic attraction.

The outer case 112, once it is assembled in position as clearly seen in FIGS. 2 and 5 in contact with heat transfer plate flange 123 and positioned by heat transfer plate bosses 124, is permanently affixed in place through the instrumentality of fastening means 146 constituted as machine screws extending through case 112 into threaded openings in header block 142.

A heater handle 148 is threadably mounted as at 150 to the header block 142. This handle can be used for manually positioning and removing the heater 110 from a magnetically attractable surface which is to be heated, and is particularly helpful when the heater must be moved after it has been in operation so that the heat transfer plate 122 is dangerously hot and the outer case 112 may be uncomfortably warm. Also, as suggested in dotted lines at 154, a forked modification 154 of the installation handle such as shown at 54 discussed in application Ser. No. 375,365 can be used to facilitate and simplify installation and removal of the heater 110 from the bottom of an automobile oil pan, for example, by clipping onto and off of the heater handle 148.

A grounded two wire electrical cable 152 extends through a provided opening in the outer case 112. As best seen in FIG. 4, a first electrical line 156 of cable 152 goes directly to a first end of the high resistance wire 129 of the electrical heating unit 128. A second electrical line 158 goes to a first terminal of a preset temperature control switch 160. As clearly seen in FIGS. 4 and 5, this control switch 160 is held in close proximity to one of the risers 132 by a spring clip 162 so that the switch is very rapidly affected by heat changes in the heat transfer plate 122 of which the riser forms an integral part. A third electrical line 161 connects a second terminal of the temperature control switch 160 to a second end of the high resistance wire 129 of electrical heating unit 128. A ground wire 159 of cable 152 is connected to the heat transfer plate 122 as at 157. By way of example, the temperature control switch 160 can be constituted to close at 360° F. (182° C.), and to open at 400° F. (204° C.).

The heater 110 can be magnetically attached to the underside of the oil pan of an automotive vehicle when the automobile is to be subjected to severe low temperature conditions, and the grounded two wire electrical cable 152 will advantageously be extended forwardly of the vehicle between the two front tires if the vehicle is parked or stored in a condition where it will have to initially back up to be used. The electrical cable 152 is then plugged into a convenient live electrical outlet, and 110 volts, for example, will thereby be applied across first and second electrical lines 156 and 158, respectively. This will energize the electrical heating unit 128, and it will heat up, heating with it the entire heat transfer plate 122 is which is encased. This will heat the magnetically attractable oil pan bottom wall, thus warming the oil pan and the oil inside of it, and generally the entire engine.

As the entire heat transfer plate warms, this includes the riser 132 to which the temperature control switch 160 is clipped. This causes the temperature of the control switch to elevate, and when the heat transfer plate reaches the temperature such that an effective heat transfer is taking place between the working face 130 of the heat transfer plate and the magnetically attractable body to which the heater is adhered, the temperature control switch 160 will open cutting off further input to the electrical heating unit. When the temperature of the heat transfer plate drops near to or below a temperature where effective heat transfer is taking place, the temperature control switch 160 again closes to energize the electrical heating unit 128.

When the operator of the automotive vehicle, for example, wishes to start the vehicle, this can be done either before or after the heater 110 is removed from the vehicle. Should the driver forget that the heater is in place, and back away, and in the event that the outer end of the electrical cable 152 is firmly anchored, the heater 110 will fall harmlessly from the engine, and the power to it will continuously cycle unnecessarily but harmlessly under the control of the temperature control switch, thus insuring that accumulated oil and grease on the floor of a garage, for example, will never reach a temperature close to their flash point or ignition point.

Although the present invention has been described with reference to preferred embodiments, workers skilled in the art will recognize that changes may be made in form and detail without departing from the spirit and scope of the invention.

What is claimed is:

1. An electrical heater for heating an object having a wall of magnetically attractable material includes:

A. an outer case having an opening therein of size and configuration commensurate with the size and shape of the portion of the object wall to which heat is to be applied;

B. a heat transfer plate of non-magnetic material having relatively good heat conductivity, said plate substantially filling said case opening, said plate providing an outwardly facing working face, and being provided with a pair of spaced-apart magnetic means receiving openings therethrough;

C. magnetic means operative in the plane of the heat transfer plate working face to fix and retain the heat transfer plate in heat transferring relation to [said] *the* object wall when the working face is brought into contact with the object wall, said magnetic means including two magnetic outer end portions, each extending through a different one of the provided magnetic means receiving openings in the heat transfer plate, and each magnetic outer end portion having an outer face lying in the plane of the heat transfer plate working face;

D. an electrical heating unit integrally associated with said heat transfer plate and in heat transmitting relation to it and to lie in surrounding relation to said magnetic means receiving openings and said magnetic means;

E. means holding said magnetic means in relatively fixed position with respect to said heat transfer plate to maintain said outer faces of said magnetic means outer end portions in the plane of the heat transfer plate working face; and F. an electrical cable extending through the outer case and electrically connected to the electrical heating unit to furnish power to the heating unit.

2. The heater of claim 1 wherein:

G. said means for holding said magnetic means includes portions of said heat transfer plate and at least one magnetic means positioning member of non-magnetic material fixedly positioned with respect to the heat transfer plate, said positioning member and heat transfer plate together defining a magnetic means positioning chamber of size and configuration to hold the magnetic means in place without necessity for bonding the magnetic means fixedly to any other elements of the heater.

3. The heater of claim 1 wherein:

G. a temperature control switch is positioned electrically in series with the electrical cable and the heating unit, is physically inside the outer case and is in heat transferring relation to the heating unit, the temperature control switch being operative to close to energize the heating unit when the switch is below a predetermined temperature range and to open when it is above that range.

4. The heater of claim 3 wherein:

H. the heat transfer plate includes an integral heating unit encasement member inside of the outer case, said encasement member lying in a plane substantially parallel to the working face of the heat transfer plate and extending in direction away from that face; and I. said electrical heating unit is substantially entirely encased within said heating unit encasement member.

5. The heater of claim 4 wherein:

J. said means for holding said magnetic means includes portions of heat transfer plate and at least one magnetic means positioning member of non-magnetic material fixedly positioned with respect to the heat transfer plate, said positioning member and heat transfer plate together defining a magnetic means positioning chamber of size and configuration to hold the magnetic means in place without necessity for bonding the magnetic means fixedly to any other elements of the heater.

6. The heater of claim 4 wherein:

J. said electrical heating unit has a major portion thereof of generally U-shape configuration and lying in a plane generally parallel to and spaced from said heat transfer plate working face thus providing two parallel, spaced-apart heating unit legs encased in the heating unit encasement member to be in surrounding relation to said magnetic means receiving openings and said magnetic means.

7. The heater of claim 6 wherein:

K. said means for holding said magnetic means includes portions of said heat transfer plate and at least one magnetic means positioning member of non-magnetic material fixedly positioned with respect to the heat transfer plate, said positioning member and heat transfer plate together defining a magnetic means positioning chamber of size and configuration to hold the magnetic means in place without necessity for bonding the magnetic means fixedly to any other elements of the heater.

8. The heater of claim 7 wherein:

L. said magnetic means positioning member is constituted as a header fastened to the heat transfer plate.

9. The heater of claim 8 wherein:

M. the heating unit encasement member of the heat transfer plate includes a pair of risers parallel to the parallel heating unit legs and extending integrally from the heating unit encasement member in direction away from the heat transfer plate working face, said risers being positioned on either side of the magnetic means, and said header being fastened to said risers.

10. The heater of claim 4 wherein:

J. said electrical heating unit is generally U-shape in configuration, and the heating unit encasement member is also of U-shape configuration providing two parallel, spaced-apart heating unit encasement legs integral with the remainder of the heat transfer plate and in surrounding relation to said magnetic means receiving openings and said magnetic means;

K. said magnetic means includes a pair of mutually parallel, spaced-apart magnetic concentrator plates defining said outer end portions extending through said heat transfer plate magnetic means receiving openings and includes a rectilinear permanent bar magnet bridging the space between the magnetic plates.

11. The heater of claim 10 wherein:

L. said means for holding said magnetic means includes portions of the heat transfer plate and at least one magnetic means positioning member of non-magnetic material fixedly positioned with respect to the heat transfer plate, said positioning member and heat transfer plate together defining a magnetic means positioning chamber of size and configuration to hold the magnetic means in place without necessity for holding the magnetic means fixedly to any other elements of the heater.

12. The heater of claim 11 wherein:

M. means is provided for preventing said outer first end portions of said concentrator plates from moving beyond the plane of the heat transfer plate working face;

N. said magnetic means positioning member is in position against opposite second end portions of said concentrator plates to prevent said concentrator plate outer end portions from moving outside of said heat transfer plate magnetic means receiving openings, and said magnetic means positioning member is provided with a relief channel in alignment with said bar magnet to provide room for expansion under temperature change of said bar magnet in direction toward said magnetic means positioning member without making contact therewith; and O. said heat transfer plate magnetic means receiving openings are so placed and are sufficiently larger than the outer end portions of said concentrator plates such that movement of the concentrator plates toward and away from each other due to expansion and contraction of said bar magnet will not cause the edges of the magnetic means receiving openings to contact the concentrator plates outer end portions so as to tend to tip the concentrator plates to weaken or break the magnetic contact between the bar magnet and said [concentration] *concentrator* plates.

*13. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with a pair of spaced-apart magnetic means receiving openings through a central portion thereof;*

*C. magnetic means operative in the plane of the heat transfer plate working face to fix and retain the heat transfer plate in heat transferring relation to the object wall when the working face is brought into contact with the object wall, said magnetic means including a pair of mutually parallel, spaced-apart magnetic concentrator plates, each magnetic concentrator plate being provided with an outer end portion extending through a different one of the provided magnetic means receiving openings in the heat transfer plate to lie in the plane of the heat transfer plate, said magnetic means also including a rectilinear bar magnet bridging the space between the magnetic plates;*

*D. an electrical heating unit integrally associated with said heat transfer plate in heat transmitting relation to it and in encompassing relation to said magnetic means;*

*E. means holding said magnetic means in relatively fixed position with respect to said heat transfer plate to maintain said outer faces of said magnetic means outer end portions in the plane of the heat transfer plate working face; and*

*F. an electrical cable extending through the outer case and electrically connected to the electrical heating unit to furnish power to the heating unit.*

*14. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided*

*with a pair of spaced-apart magnetic means receiving openings through a central portion thereof;*

*C. magnetic means operative in the plane of the heat transfer plate working face to fix and retain the heat transfer plate in heat transferring relation to the object wall when the working face is brought into contact with the object wall, said magnetic means including two magnetic outer end portions, each extending through a different one of the provided magnetic means receiving openings in the heat transfer plate, and each magnetic outer end portion having an outer face lying in the plane of the heat transfer plate working face;*

*D. an electrical heating unit integrally associated with said heat transfer plate in heat transmitting relation to it and in encompassing relation to said magnetic means;*

*E. means holding said magnetic means in relatively fixed position with respect to said heat transfer plate to maintain said outer faces of said magnetic means outer end portions in the plane of the heat transfer plate working face; and*

*F. an electrical cable extending through the outer case and electrically connected to the electrical heating unit to furnish power to the heating unit.*

*15. The heater of claim 14 wherein:*

*G. a temperature control switch is positioned electrically in series with the electrical cable and the heating unit, is physically inside the outer case and is in heat transferring relation to the heating unit, the temperature control switch being operative to close to energize the heating unit when the switch is below a predetermined temperature range and to open when it is above that range.*

*16. The heater of claim 15 wherein:*

*H. the heat transfer plate includes an integral heating unit encasement member inside of the outer case, said encasement member lying in a plane substantially parallel to the working face of the heat transfer plate and extending in direction away from that face; and*

*I. said electrical heating unit is substantially entirely encased within said heating unit encasement member.*

*17. The heater of claim 16 wherein:*

*J. said electrical heating unit is generally U-shape in configuration, and the heating unit encasement member is also of U-shape configuration providing two parallel, spaced-apart heating unit encasement legs integral with the remainder of the heat transfer plate and in encompassing relation to said magnetic means; and*

*K. said magnetic means includes a pair of mutually parallel, spaced-apart magnetic concentrator plates defining said outer end portions extending through said heat transfer plate magnetic means receiving openings and includes a rectilinear permanent bar magnet bridging the space between the magnetic plates.*

*18. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with a pair of spaced-apart magnetic means receiving openings through a central portion thereof;*

*C. magnetic means operative in the plane of the heat transfer plate working face to fix and retain the heat transfer plate in heat transferring relation to the object wall when the working face is brought into contact with the object wall, said magnetic means including a pair of mutually parallel, spaced-apart magnetic concentrator plates, each magnetic concentrator plate being provided with an outer end portion extending through a different one of the provided magnetic means receiving openings in the heat transfer plate to lie in the plane of the heat transfer plate, said magnetic means also including a rectilinear bar magnet bridging the space between the magnetic plates;*

*D. an electrical heating unit integrally associated with said heat transfer plate in heat transmitting relation to it, said heating unit and said heat transfer plate lying in encompassing relation to said magnetic means;*

*E. means holding said magnetic means in relatively fixed position with respect to said heat transfer plate to maintain said outer faces of said concentrator plate outer end portions in the plane of the heat transfer plate working face; and*

*F. an electrical cable extending through the outer case and electrically connected to the electrical heating unit to furnish power to the heating unit.*

*19. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with a pair of spaced-apart magnetic means receiving openings through a central portion thereof;*

*C. magnetic means operative in the plane of the heat transfer plate working face to fix and retain the heat transfer plate in heat transferring relation to the object wall when the working face is brought into contact with the object wall, said magnetic means including a pair of mutually parallel, spaced-apart magnetic concentrator plates, each magnetic concentrator plate being provided with an outer end portion extending through a different one of the provided magnetic means receiving openings in the heat transfer plate to lie in the plane of the heat transfer plate, said magnetic means also including a rectilinear bar magnet bridging the space between the magnetic plates;*

*D. an electrical heating unit integrally associated with said heat transfer plate in heat transmitting relation to it and situated to lie in surrounding relation to at least one of said magnetic means receiving openings and in adjacent relation to said magnetic means;*

*E. means holding said magnetic means in relatively fixed position with respect to said heat transfer plate to maintain said outer faces of said magnetic means outer end portions in the plane of the heat transfer plate working face; and*

*F. an electrical cable extending through the outer case and electrically connected to the electrical heating unit to furnish power to the heating unit.*

*20. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with a pair of spaced-apart magnetic means receiving openings therethrough;*

*C. magnetic means operative in the plane of the heat transfer plate working face to fix and retain the heat transfer plate in heat transferring relation to the object wall when the working face is brought into contact with the object wall, said magnetic means including two magnetic outer end portions, each extending through a different one of the provided magnetic means receiving openings in the heat transfer plate, and each magnetic outer end portion having an outer face lying in the plane of the heat transfer plate working face;*

*D. an electrical heating unit integrally associated with said heat transfer plate and in heat transmitting relation to it;*

*E. means holding said magnetic means in relatively fixed positon with respect to said heat transfer plate to maintain said outer faces of said magnetic means outer end portions in the plane of the heat transfer plate working face; and*

*F. an electrical cable extending through the outer case and electrically connected to the electrical heating unit to furnish power to the heating unit.*

*21. The heater of claim 20 wherein:*

*G. said means for holding said magnetic means includes portions of said heat transfer plate and at least one magnetic means positioning member of non-magnetic material fixedly positioned with respect to the heat transfer plate, said positioning member and heat transfer plate together defining a magnetic means positioning chamber of size and configuration to hold the magnetic means in place without necessity for bonding the magnetic means fixedly to any other element of the heater.*

*22. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with a pair of spaced-apart magnetic means receiving openings therethrough;*

*C. magnetic means operative in the plane of the heat transfer plate working face to fix and retain the heat transfer plate in heat transferring relation to the object wall when the working face is brought into contact with the object wall, said magnetic means including a pair of mutually parallel, spaced-apart magnetic concentrator plates, each magnetic concentrator plate being provided with an outer end portion extending through a different one of the provided magnetic means receiving openings in the heat transfer plate to lie in the plane of the heat transfer plate, said magnetic means also including a rectilinear bar magnet bridging the space between the magnetic plates;*

*D. an electrical heating unit integrally associated with said heat transfer plate in heat transmitting relation to it;*

*E. means holding said magnetic means in relatively fixed position with respect to said heat transfer plate to maintain said outer faces of said magnetic means outer end portions in the plane of the heat transfer plate working face; and*

*F. an electrical cable extending through the outer case and electrically connected to the electrical heating unit to furnish power to the heating unit.*

*23. The heater of claim 22 wherein:*

*G. said means for holding said magnetic means includes portions of said heat transfer plate and at least one magnetic means positioning member of non-magnetic material fixedly positioned with respect to the heat transfer plate, said positioning member and heat transfer plate together defining a magnetic means positioning chamber of size and configuration to hold the magnetic means in place without necessity for bonding the magnetic mean fixedly to any other elements of the heater.*

*24. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with access therethrough to receive outer end portions of a magnetic means;*

*C. magnetic means operative in the plane of the heat transfer plate working face to fix and retain the heat transfer plate in heat transferring relation to the object wall when the working face is brought into contact with the object wall, said magnetic means including two magnetic outer end portions, each extending through the provided access in the heat transfer plate, and each magnetic outer end portion having an outer face lying in the plane of the heat transfer plate working face;*

*D. an electrical heating unit integrally associated with said heat transfer plate and in heat transmitting relation to it;*

*E. means holding said magnetic means in relatively fixed position with respect to said heat transfer plate to maintain said outer faces of said magnetic means outer end portions in the plane of the heat transfer plate working face; and*

*G. an electrical cable extending through the outer case and electrically connected to the electrical heating unit to furnish power to the heating unit.*

*25. An electrical heater for heating an object having a wall of magnetically attractable material includes:*

*A. an outer case having an opening therein of size and configuration commensurate with the size and shape of the portion of the object wall to which heat is to be applied;*

*B. a heat transfer plate of non-magnetic material having relatively good heat conductivity, said plate substantially filling said case opening, said plate providing an outwardly facing working face, and being provided with access therethrough to receive outer end portions of a magnetic means;*

*C. magnetic means operative in the plane of the heat transfer plate working face to fix and retain the heat transfer plate in heat transferring relation to said object wall when the working face is brought into contact with the object wall, said magnetic means including magnetic end portions extending through the provided access in the heat transfer plate and providing a magnetic outer face operative in the plane of the heat transfer plate working face;*

*D. an electrical heating unit integrally associated with said heat transfer plate and in heat transmitting relation to it;*

*E. means holding said magnetic means in relatively fixed position with respect to said heat transfer plate to maintain said magnetic outer face in the plane of the heat transfer plate working face; and*

*F. an electrical cable extending through the outer case and electrically connected to the electrical heating unit to furnish power to the heating unit.*

• • • • •

UNITED STATES PATENT AND TRADEMARK OFFICE

CERTIFICATE OF CORRECTION

PATENT NO. : RE 32,643

DATED : April 12, 1988

INVENTOR(S) : James W. Bennett et al.

It is certified that error appears in the above-identified patent and that said Letters Patent is hereby corrected as shown below:

Column 7, line 58, delete "holding" and insert --bonding--.

Column 12, line 21, delete "mean" and insert --means--.

Signed and Sealed this

Thirtieth Day of August, 1988

*Attest:*

DONALD J. QUIGG

*Attesting Officer*

*Commissioner of Patents and Trademarks*